Patented June 11, 1946

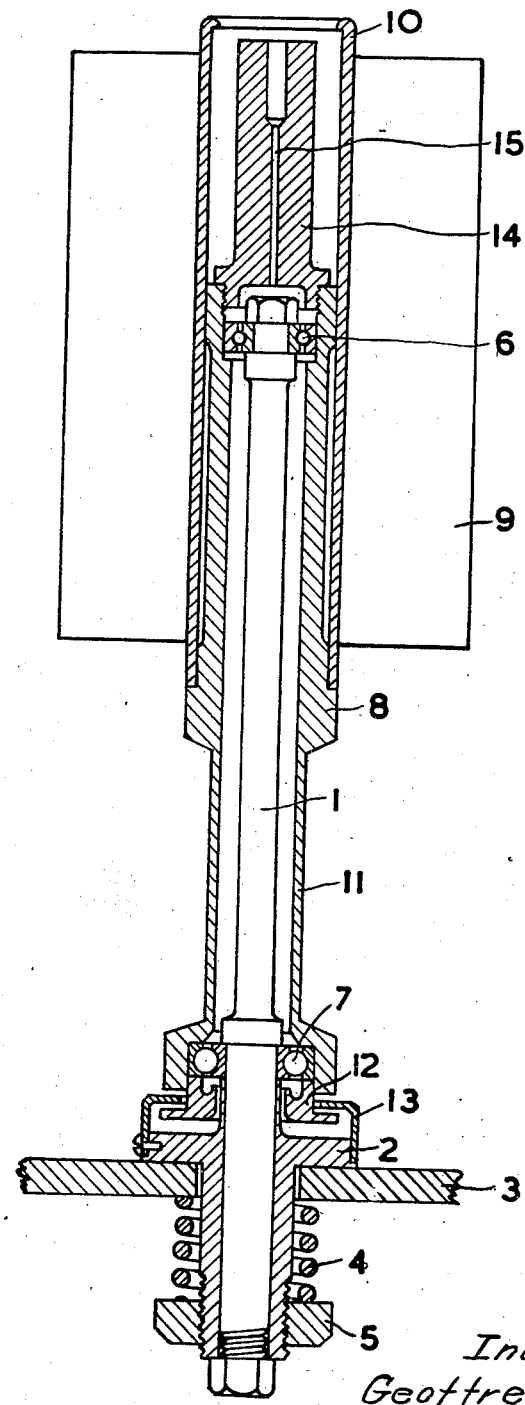

2,402,028

UNITED STATES PATENT OFFICE 2,402,028

TWISTING SPINDLE FOR SPINNING, TWISTING, AND LIKE MACHINES

Geoffrey Curtis, Coventry, England, assignor to Courtaulds Limited, London, England, a company of Great Britain Application July 18, 1944, Serial No. 545,461
In Great Britain September 9, 1943

2 Claims. (Cl. 57—130)

This invention relates to twisting spindles for spinning, twisting and like machines.

Spindles are already known in which a revolving or live yarn package support is supported by a flexible centrally-positioned fixed or dead spindle which has at its upper end an anti-friction bearing. In operation it is found that the bearing is subjected to centrifugal forces arising from the fact that the dynamic axis of the yarn package is, in general, not coincident with the axis of rotation of the package support. The elimination or reduction of such centrifugal forces is desirable since the resultant forces which are set up in the spindle shaft and transmitted to the machine frame cause increased wear on the machine parts. In U. S. Patent No. 2,207,495 it is proposed to relieve the spindle shaft of static centrifugal forces by arranging a roller bearing at the centre of gravity of the rotating weight and so mounting the roller bearing that unbalances of the rotating mass on the twisting spindle are taken up directly by the said bearing; in the embodiment described the roller bearing for supporting the spindle shaft is rigidly arranged at or near the centre of gravity of the rotating mass by means of an extension of the spindle base.

According to the present invention, apparatus for use in unwinding and simultaneously twisting yarn from a yarn package rotating at at least 7,000 revolutions per minute, comprises in combination a rotatable yarn package support and a solid, fixed spindle having at its lower end a ball bearing capable of carrying the weight of the yarn package support and the yarn package and a ball or roller bearing arranged at its upper end at or near the centre of gravity of the aforesaid yarn package, the natural frequency of vibration of the spindle when loaded with the yarn package support being considerably less than 7,000 vibrations per minute.

In determining the natural frequency of vibration of the fixed spindle when loaded with the yarn package support in accordance with the invention, the spindle is considered as a cantilever with the combined effective weight of both the package support and the fixed spindle acting at the upper bearing. The effective weight of the support at the upper bearing of the spindle is determined by apportioning the weight of the support to the top and bottom bearings as follows: As the support is substantially symmetrical about its central axis, its centre of gravity will lie on this axis; if the length of the axis is L inches, the centre of gravity A inches from the bottom bearing and the weight of the support W lb., the effective weight at the top bearing is $$\frac{WA}{L} \text{ lb.}$$

and at the bottom bearing $$\frac{W(L-A)}{L} \text{ lb.}$$

The effecive weight of the fixed spindle is taken as one-quarter of its weight, and is preferably kept small compared with the effective weight of the yarn package support.

It is shown in the chapter entitled "Vibration" in "Mechanics Applied to Engineering" (ninth edition) by J. Goodman, on page 264, that the time in seconds of one complete oscillation for a weight W lb. on the end of a cantilever L inches long is given by:

$$0.185\sqrt{\frac{WL^3}{EI}}$$

where E is the modulus of elasticity in pounds per square inch and I the moment of inertia of the cantilever. For a cylindrical spindle, for which $$I = \frac{\pi d^4}{64}$$

$d$ being the diameter of the spindle in inches, it follows that the natural frequency of vibration, expressed as vibrations per minute, is given by $$71.9d^2\sqrt{\frac{E}{WL^3}}$$

The natural frequency of vibration of an unloaded twisting spindle of the type to which reference has been made therefore depends upon (a) the diameter of the fixed spindle; (b) the modulus of the material from which the fixed spindle is made; (c) the length of the fixed spindle and (d) the effective weight at the upper bearing. Furthermore, since the natural frequency of vibration depends on the effective weight at the upper bearing, the addition of the yarn package alters this frequency, which will have its maximum value when the yarn support is empty, the effective weight in this case being only that due to the package support and the spindle. The spindle according to this invention is specially designed for running at high speeds, that is to say, at speeds of at least 7,000 revolutions per minute. When running at such high speeds it is found that if the dimensions of the fixed spindle are so chosen that its calculated number of vibrations per minute is considerably less than 7,000 vibrations per minute, for example 3,500 or less vibrations per minute, the static centrifugal forces arising from the inevitable unbalance of the spindle are reduced and consequently the vibration in the spinning machine is also considerably reduced. In order to make the frequency of vibration as low as possible, it is desirable that the package support should be heavier than usual and that as much of the weight thereof as possible should be located near the upper bearing.

An example of a twisting spindle in accordance with the present invention is illustrated in vertical cross-section in the accompanying drawing. A fixed steel spindle of length 6.25 inches and diameter 0.375 inch is suitable for a yarn package weighing 2 lbs., the effective weight of the package support and spindle at the upper bearing being 1.3 lbs. The support is rotated at 8,000 revolutions per minute. The modulus for steel is $30 \times 10^6$ pounds per square inch so that the natural frequency of vibration of the spindle when loaded with the yarn package support and the yarn package is 1950 vibrations per minute and the natural frequency of the spindle when loaded with the yarn package support only is 3100 vibrations per minute.

The fixed spindle consists of a rod 1 of the given dimensions rigidly mounted at its lower end in a bolster 2 which is fitted to a machine frame 3 in the usual manner by a spring 4 and nut 5. The rod 1 carries at its upper end a small-diameter rigid journal bearing 6 and at its lower end, just above the bolster 2, a larger journal bearing 7. A rotating support 8, shaped so as to fit a yarn package 9 wound on a tube 10, is supported by the bearings 6 and 7 and the bearing 6 is arranged substantially at the centre of gravity of the yarn package 9. The lower portion of the support 8 above the bearing 7 is reduced in diameter to form a whorl 11 for driving the support 8 by a belt in the usual manner. The lower ball-race 7 is oiled by an oil-thrower 12 rotating inside a dust cap 13 fastened to the bolster 2, thus serving to protect the ball-race from dust and foreign matter. The oil-thrower 12 is a press fit in the support 8. In order to increase the effective weight of the support at the upper bearing the support is provided with an extended cap 14 the length of which may be varied as desired. A small hole 15 is provided in the cap 14 so that the ball-races may be oiled. In cases where a high twist is required in the yarn, a flyer may be fixed in the cap 14.

What I claim is:

1. Apparatus for use in unwinding and simultaneously twisting yarn from a yarn package rotating at at least 7,000 revolutions per minute, comprising in combination a rotatable yarn package support, a bolster and a solid, fixed spindle rigidly mounted in said bolster and having at its lower end a ball bearing capable of carrying the weight of the yarn package support and the yarn package carried by the support and an antifriction bearing arranged at its upper end in the vicinity of the centre of gravity of the yarn package carried by the support and said spindle being constructed and arranged to have a natural frequency of vibration when loaded with the yarn package support of considerably less than 7,000 vibrations per minute.

2. Apparatus for use in unwinding and simultaneously twisting yarn from a yarn package rotating at at least 7,000 revolutions per minute, comprising in combination a rotatable yarn package support, a bolster and a solid, fixed spindle rigidly mounted in said bolster and having at its lower end a ball bearing capable of carrying the weight of the yarn package support and the yarn package carried by the support and an antifriction bearing arranged at its upper end in the vicinity of the centre of gravity of the yarn package carried by the support and said spindle being constructed and arranged to have a natural frequency of vibration when loaded with the yarn package support of less than 3,500 vibrations per minute.

GEOFFREY CURTIS.